Feb. 4, 1958 G. M. DINNICK 2,822,418
CONNECTOR FOR TUBULAR CONDUITS
Filed Dec. 5, 1952 2 Sheets-Sheet 1
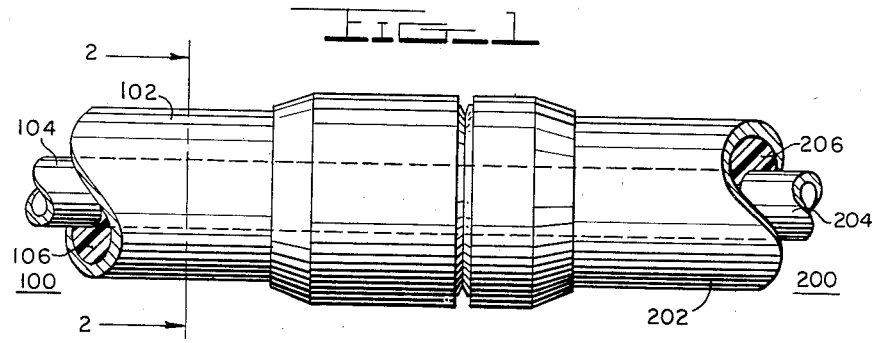
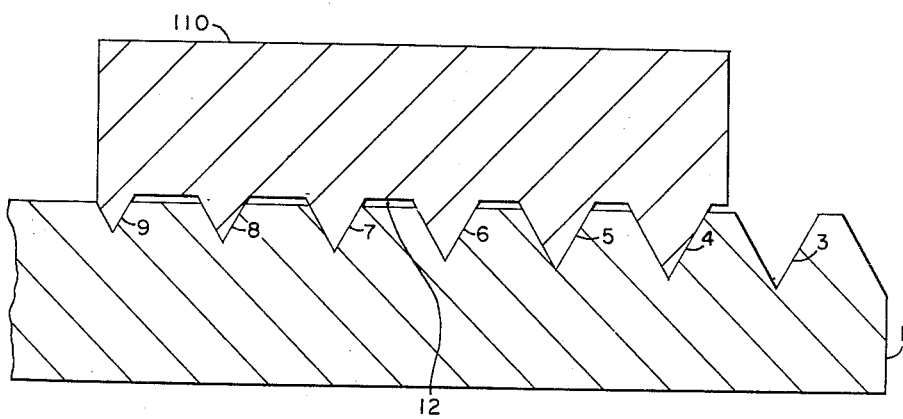
INVENTOR
GEORGE M. DINNICK
BY
ATTORNEYS Feb. 4, 1958  G. M. DINNICK  2,822,418
CONNECTOR FOR TUBULAR CONDUITS
Filed Dec. 5, 1952  2 Sheets-Sheet 2
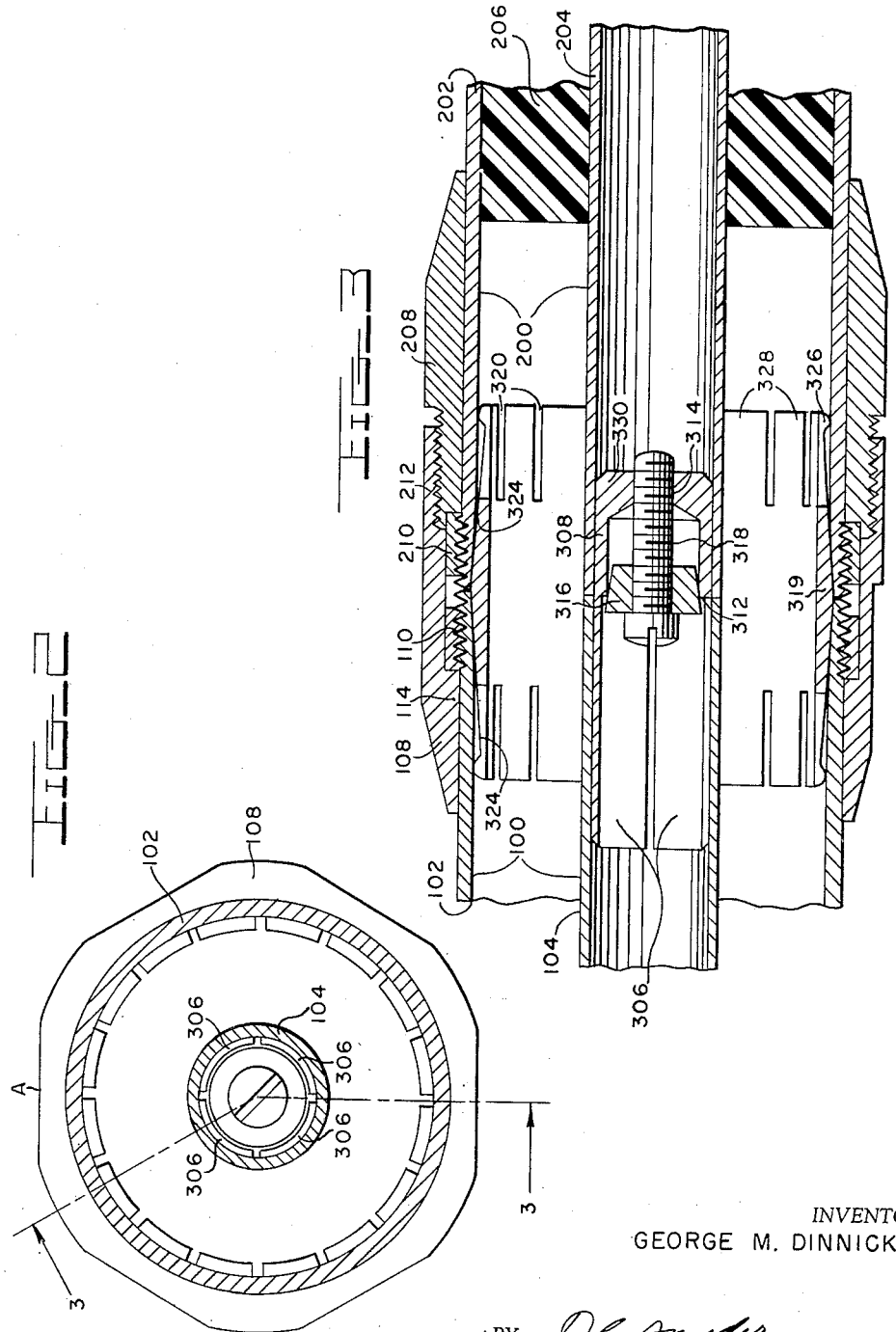
INVENTOR
GEORGE M. DINNICK
BY
ATTORNEYS United States Patent Office 2,822,418
Patented Feb. 4, 1958

2,822,418

CONNECTOR FOR TUBULAR CONDUITS

George M. Dinnick, Oxon Hill, Md., assignor to the United States of America as represented by the Secretary of the Navy Application December 5, 1952, Serial No. 324,433

1 Claim. (Cl. 174—88)

(Granted under Title 35, U. S. Code (1952), sec. 266)

This invention relates to connectors for tubular conduits and the like and more particularly to improvements in connectors for joining sections of concentric transmission lines.

Electric lines of the type here under consideration consist of a pair of coaxially disposed, thin-walled tubular members, generally of lengths that must be connected end-to-end in order to be sufficiently long to satisfy practical requirements. The walls of the outer conductor in particular are quite thin in comparison with the outside diameter of the conductor so that notches or annular grooves in the outer surface of the conductor will result in a very great diminution of the maximum tensile and compressional strengths of the outer wall. This diminution may be quite serious in those applications where necessity requires relatively high compressional and tensile working loads, such as where long sections of cable are subjected to extremes in operating or ambient temperatures.

A connecting device for such concentric lines must be both simple and rugged, so as to be suitable for use in localities removed from access to shop facilities, and also so as to be useable by relatively unskilled workmen. As these devices usually conduct radio waves, they must also provide a good electrical impedance match between sections to avoid discontinuities in the radio field within the conductor. An example of a prior art connecting device designed for use in such applications is that shown in Patent No. 2,209,152 to H. C. Daniels. This device provides a pair of tightening or coupling nuts threaded to opposite ends of a common coupling sleeve. The coupling nuts work against thrust rings fitted around the outer conductors so that rotation of the sleeves results in an axial movement of the sections to be joined so as to provide axial compression between the matching tubular sections. The thrust rings are secured to the outer tubular conductor by means of deep annular grooves cut in the surface of the conductor; the result is a considerable reduction in the maximum compressional and tensile shearing stress that may be applied to the conductor, as mentioned above.

The coupling sleeve-thrust ring combination provides a very satisfactory, relatively simple means for joining concentric line sections but the reduction in shearing strength resulting when the thrust ring is secured to the outer conductor in the manner described in the aforementioned patent imposes a serious limitation that must be overcome before the general method of coupling can be really satisfactory. It is obvious that the thrust rings could be welded or swaged on to the outer conductor to eliminate cutting into the conductor itself, but heat deformation resulting from such operations would also seriously reduce the shearing strength of the metal, and plastic insulation often used in such lines would be destroyed. Accordingly, one object of the present invention is to provide a coupling for sections of concentric electric conductors that will preserve the shearing strength of the conductors.

Another object of this invention is to provide a strong, durable connection for sections of tubular conduit or concentric line that may be readily assembled by relatively unskilled workmen under field conditions.

A further object of this invention is to provide a connector for sections of concentric electric conductors that will minimize reflection losses of radio waves transmitted within the sections of concentric line.

Other objects and features of the present invention will become apparent upon consideration of the following detailed description in connection with the accompanying drawings which illustrate a preferred embodiment of the invention. It is to be expressly understood, however, that the drawings are designed for purposes of illustration only and not as a definition of the limits of the invention, reference for the latter purpose being had to the appended claim.

In the drawings:

Figure 1 is a side elevational view of a concentric line joint-construction made in accordance with the present invention;

Figure 2 is a transverse sectional view taken on line 2—2 of Figure 1;

Figure 3 is a longitudinal sectional view taken on line 3—3 of Figure 2;

Figure 4 is a more detailed view of a portion of Figure 3.

With reference now to Figure 1 of the drawings, the concentric line sections to be joined by the novel coupling unit herein described are represented at 100 and 200. Concentric line 100 consists of an outer conductor 102 and a hollow inner conductor 104. Likewise, concentric line 200 is made up of outer conductor 202 and a hollow inner conductor 204. As has been indicated, the conductors are tubular and concentric; they are uniformly spaced from each other by suitable solid dielectric materials, or by shorted quarter wave stub supports as shown in U. S. Navy Publication NavShips 900,028 (1944), page 2. If solid dielectric spacing material is used, as depicted by reference numerals 106 and 206, the dielectric must be foreshortened within the conductors to provide room for the coupling components. Removing the dielectric a few inches from the end of each concentric line section will be sufficient for most purposes.

Referring now to Figures 2 and 3, it can be seen that in a concentric line application inner conductors 104 and 204 are joined at their abutting ends by a small metallic, cylindrical support member 308 inserted in the adjacent ends of these conductors. Member 308 has one end thereof hollowed out and the other end thereof is closed so as to form a base section, the outer diameter of which is substantially the same as the inner diameter of inner conductor 204 so that the base section of support member 308 fits snugly into conductor 204. Inasmuch as the inner diameters of the two inner conductors 104 and 204 may differ slightly, and as the conductors are subjected to bending loads, it is necessary that support member 308 be flexible and also that its outer diameter be adjustable to some extent. To accomplish this the open end of support member 308 is slotted for about three-quarters of its length to provide a plurality of spring fingers 306. The spring fingers 306 terminate in the base section of member 308 where the internal diameter of member 308 has been reduced to form a shoulder 312. A threaded bore 314 is tapped axially through the center of the solid end 330 and a small wedge 316 in the shape of a truncated cone the average diameter of which is the same as the inner radius of shoulder 312, is also provided with an axial bore. Screw 318 extends through the wedge 316 and is threaded through bore 314 so as to bring wedge 316 to bear against shoulder 312. The spring fingers 306 may be adjusted so as to fit smoothly against the inner surface of conductor 104 after the base of support member 308 has been inserted into conductors 204, as the fingers 306 will spread apart when the wedge 316 is tightened against shoulder 312.

In coupling the outer conductors 102, 202 an internal cylindrical support ring 319 is inserted at the junction of the outer conductors. The outer diameter of the support ring is very slightly greater than the inner diameter of the outer conductors for a reason that will be made apparent below. For a 3.25 inch inner diameter of the outer conductor a diameter of 3.29 to 3.31 inches has been found to be satisfactory for the ring. A number of short pressure relieving slots 320 are cut back perpendicularly to the ends of the support ring so that the ring may be easily slipped into outer conductors 102, 202. Slight tapers 324 are cut into the ring on the outer surface thereof and extend from the center of the ring almost to each end so that the outer conductors 102, 202 may be slipped over the ring. Near each end of the ring the taper is terminated so that annular contact ridges 326 are provided at the ends of the fingers 328 formed by the pressure relieving slots 320. The purpose of the contact ridges is to provide good electrical contact between the ends of the ring 318 and the inner surface of the outer conductors 102, 202. The support ring is of such a length as to practically abut against the solid dielectric removed as mentioned previously.

To form a strong, dependable mechanical coupling between the outer conductors 102 and 202, the adjacent ends of conductors 102 and 202 are externally threaded to receive suitable thrust rings 110 and 210. As more carefully shown in Figure 4, a standard 60 degree thread is cut into the outer surfaces of outer conductors 102 and 202. The thread is cut deepest at the end of the conductor and then gradually and progressively diminishes in depth until it is quite shallow after 6 to 10 turns. With reference to Figure 4, numeral 1 represents the end of outer conductor 102. As can be seen, the first turn 3 of the thread, nearest the end of the conductor, is cut quite deeply into the outer surface of the conductor. As the thread progresses back from the end of the conductor, its depth is gradually tapered, as shown by the thread-grooves 4, 5, 6, 7, 8 and 9. The reason for this construction is primarily to increase the maximum shearing strength of the outer conductor as much as possible. It has been found that the greatest shearing stress occurs at the last turn of the thread away from the end of the conductor, so that the smaller the depth of the thread groove is at this point, the greater will be the maximum transverse shearing stress that can be placed upon the conductor. By gradually tapering the thread so that the deepest cut is at the end of the conductor the maximum transverse shearing stress will continue to occur at the turn of the thread farthest away from the end of the conductor and a large longitudinal tensile stress may still be carried by the threads. Tapering the thread also has another advantage that will be brought out below.

Thrust ring 110 is internally threaded so as to have a taper which mates with the thread cut into the outer surface of the outer conductor 102 as described above. This thread, however, is slightly deeper than that in the outer conductor so as to leave a slight clearance 12 between the thrust ring and the outer surface of the outer conductor so that space will be left between the mating threads when the thrust ring is threaded on to the outer conductor.

A pair of coupling sleeves 108 and 208, the inner radius of which is the same as the outer raduis of the outer conductor, are slipped over the outer conductors before thrust rings 110 and 210 are tightened into place. Coupling sleeve 108 overlies thrust ring 110 and has an annular flange 114 adapted to abut against the edge of thrust ring 110, and also has an externally screw-threaded portion 212 adapted to threadedly engage the screw-threaded portion of coupling nut 208. This end of coupling nut 208 also abuts against thrust ring 210. Each coupling nut is provided with flat sections generally designated A in Figure 2, for convenience in engaging a pipe wrench therewith to tighten or to loosen the nuts.

In assembling the parts as have been described thus far, it will be assumed that the coupling nuts 108 and 208, and thrust rings 110 and 210 have been assembled as shown in Figure 3. The long support member 308 is slid into inner conductor 204, and screw 304 is adjusted until spring fingers 306 slide smoothly into inner conductor 104. The outer conductors are slid over spring fingers 328 of cylindrical support ring 319 and are forced together as far as possible. Coupling nuts 108 and 208 are screw-threadedly engaged with the screw end of coupling nut 208; both nuts are screwed tight in opposite directions to draw the outer conductor sections 102 and 202 oppositely relative to one another. By virtue of the fact that it is impossible for the ends of the outer conductors to buckle inwardly because of the presence of cylindrical support ring 319 and that it is also impossible for them to buckle outwardly because of the bonding and restraining action afforded by thrust rings 110 and 210, the compressional action caused by tightening nuts 108 and 208 is made so great as to form a cold weld at the abutting ends of conductors 102 and 202. Thus, a very simple gas and humidity tight joint is formed between the ends of the outer conductors 102 and 202.

As has been mentioned, the midsection of the ring is of a slightly greater diameter than the inner diameter of the conductors. As the conductors are drawn up on to the ring, the aluminum threads that mate with thrust rings 110 and 210 are found to cold flow and the effect is that the thrust rings are cold welded to the conductor. The clearance 12 is filled as a result of this cold flow of the aluminum so that the weld is effected not only at the teeth of the thread, but along the entire length of the thread between the thrust rings and the outer conductor.

It should be noted that the thickness of cylindrical support ring 319 is critical if it is desired that the characteristic impedance of the joint to high frequency waves be the same as that of the concentric line using solid dielectric spacing material. As shown in the text "Radio Engineers Handbook" by F. E. Terman, first edition (1942), page 174, the characteristic impedance of a coaxial line is a function of the dielectric constant of the medium between the conductors, and also of the ratio of the inner radius of the outer conductor to the outer radius of the inner conductor. Compensation can therefore be made for a change from a solid, beaded, or spiral solid dielectric to air dielectric at the joint by changing the inner radius of the outer conductor, or in the instant case, by adjusting the thickness of the cylindrical support ring.

The radial thickness and the length of the thrust rings 110 and 210 are not particularly critical; however, when the coupling nuts are tightened, both radial forces and longitudinal shearing forces are imposed on the thrust rings, so the thickness must be sufficient to withstand the radial forces and the length must be great enough to provide sufficient thread length to prevent longitudinal shearing from occurring. It should also be noted that it is necessary for one end of each of the thrust rings to be quite near the abutting end of its respective tubular member in order to prevent outward fluting or flaring of the abutting ends when the coupling nuts are being tightened.

The internal and external conductor sections and body members of the conductors are preferably made of high conductive material such as copper or aluminum. The other parts may be made of any suitable material such, for example, as brass except for the cylindrical support ring 319. It is preferable that this ring be made of Phosphor bronze because of its strength combined with good conductivity.

The invention may be carried out in specific ways other than herein set forth without departing from the spirit and essential characteristics of the invention; the present embodiment is, therefore, to be considered in all respects as illustrative and not restrictive and all changes coming within the meaning and equivalent range of the appended claim are intended to be embraced therein.

The invention described herein may be manufactured and used by or for the Government of the United States of America for governmental purposes without the payment of any royalties thereon or therefor.

What is claimed is:

In a connector for joining sections of coaxial conductors of the type wherein one conductor is positioned within the other, first and second threaded thrust rings adapted to threadedly engage respectively first and second adjacent ends of the outer conductors of said sections to be connected, each of said first and second adjacent ends having tapered threads on the outer surface thereof progressively decreasing in depth as the thread extends away from said adjacent end of the outer conductor, the thread depth at one end of said tapered thread being substantially one half the thread depth at the opposite thereof, said threaded thrust rings being adapted to mate in a contiguous manner with said respective threaded ends of said outer conductors, a rigid internal sleeve member having a tapered outer diameter which varies to a maximum diameter at the midsection thereof and being adapted to be snugly positioned within the tubular members at their point of juncture, said internal sleeve member being of a thickness such as to maintain the characteristic impedance of the joint substantially the same as that of the sections of coaxial conductors, means operative to maintain the adjacent ends of the inner conductors in alignment, a first coupling sleeve surrounding one of said outer conductors between the associated thrust ring and the far end of said outer conductor, a second coupling sleeve surrounding the other outer conductor at a point between its associated thrust ring and the far end of said other outer conductor, each of said coupling sleeves having parts adapted to bear against the associated thrust ring and at least one of said coupling sleeves being adapted to overlie its associated thrust ring and threadedly engage the other coupling sleeve.

References Cited in the file of this patent

UNITED STATES PATENTS

| Number | Name | Date |
|---|---|---|
| 135,898 | English | Feb. 18, 1873 |
| 1,762,191 | Ober | June 10, 1930 |
| 2,014,853 | Ley et al. | Sept. 17, 1935 |
| 2,057,242 | Mautsch | Oct. 13, 1936 |
| 2,209,152 | Daniels | July 23, 1940 |
| 2,245,419 | Unke | June 10, 1941 |
| 2,305,668 | Bruno | Dec. 22, 1942 |
| 2,567,113 | Kristensen | Sept. 4, 1951 |
| 2,640,095 | Lewis et al. | May 26, 1953 |